US010303726B2

(12) United States Patent
Weyerhaeuser et al.

(10) Patent No.: US 10,303,726 B2
(45) Date of Patent: May 28, 2019

(54) DECOUPLING FILTER INJECTION AND EVALUATION BY FORCED PUSHDOWN OF FILTER ATTRIBUTES IN CALCULATION MODELS

(71) Applicant: SAP SE, Walldorf (DE)

(72) Inventors: Christoph Weyerhaeuser, Heidelberg (DE); Tobias Mindnich, Walldorf (DE); Johannes Merx, Heidelberg (DE); Joerg Schad, Leimen (DE); Stefan Dipper, Wiesloch (DE)

(73) Assignee: SAP SE, Walldorf (DE)

( * ) Notice: Subject to any disclaimer, the term of this patent is extended or adjusted under 35 U.S.C. 154(b) by 503 days.

(21) Appl. No.: 14/540,781

(22) Filed: Nov. 13, 2014

(65) Prior Publication Data

US 2016/0140241 A1 May 19, 2016

(51) Int. Cl.
*G06F 16/9535* (2019.01)
*G06F 16/2453* (2019.01)
*G06F 16/901* (2019.01)

(52) U.S. Cl.
CPC ...... *G06F 16/9535* (2019.01); *G06F 16/2453* (2019.01); *G06F 16/9024* (2019.01)

(58) Field of Classification Search
CPC ......... G06F 17/30867; G06F 17/30442; G06F 17/30958; G06F 17/30023; G06F 17/30634; G06F 17/30864; G06F 17/30964; G06F 17/30448
USPC ............... 707/710, 708, 736, 754, 759, 769, 707/999.001, 999.003, 999.004, E17.005
See application file for complete search history.

(56) References Cited

U.S. PATENT DOCUMENTS

| | | | |
|---|---|---|---|
| 5,659,725 A * | 8/1997 | Levy ................. | G06F 17/30454 |
| 6,088,524 A * | 7/2000 | Levy ................. | G06F 17/30454 707/713 |
| 6,581,054 B1 * | 6/2003 | Bogrett ............. | G06F 17/30395 |
| 2002/0198872 A1* | 12/2002 | MacNicol ......... | G06F 17/30445 |
| 2003/0120682 A1* | 6/2003 | Bestgen ............ | G06F 17/30436 |
| 2005/0267877 A1* | 12/2005 | Chaudhuri ........ | G06F 17/30463 |
| 2008/0040320 A1* | 2/2008 | Dettinger .......... | G06F 17/30427 |
| 2009/0006346 A1* | 1/2009 | C N .................. | G06F 16/24542 |
| 2010/0030896 A1* | 2/2010 | Chandramouli .. | G06F 17/30516 709/224 |
| 2010/0161576 A1* | 6/2010 | Chen ................. | G06F 17/30563 707/705 |
| 2011/0131199 A1* | 6/2011 | Simon ............... | G06F 17/30463 707/714 |
| 2012/0109934 A1* | 5/2012 | Weyerhaeuser .. | G06F 17/30463 707/713 |
| 2012/0323885 A1* | 12/2012 | Wang ................ | G06F 17/30448 707/714 |

(Continued)

*Primary Examiner* — Jeff A Burke
*Assistant Examiner* — Kamal K Dewan
(74) *Attorney, Agent, or Firm* — Fish & Richardson P.C.

(57) ABSTRACT

According to an aspect, a system for moving a filter in a query model to ensure query semantics includes a query engine configured to obtain a query model for a query to be executed on a database. The query engine includes a query optimizer configured to instantiate the query model by merging the query with the query model. The query optimizer includes a filter mover configured to move a filter to a point within the instantiated query model such that semantics for the query within the instantiated query model is ensured.

15 Claims, 5 Drawing Sheets

(56) References Cited

U.S. PATENT DOCUMENTS

| | | | |
|---|---|---|---|
| 2013/0290292 A1* | 10/2013 | Weyerhaeuser | G06F 17/30463 707/713 |
| 2014/0067793 A1* | 3/2014 | Shironoshita | G06F 17/30436 707/718 |
| 2014/0281746 A1* | 9/2014 | Ercegovac | G06F 11/0727 714/48 |
| 2014/0304251 A1* | 10/2014 | Bornea | G06F 17/30463 707/718 |
| 2014/0372438 A1* | 12/2014 | Chandramouli | G06F 17/30598 707/737 |
| 2016/0098448 A1* | 4/2016 | McShane | G06F 17/2705 707/713 |

\* cited by examiner

DECOUPLING FILTER INJECTION AND EVALUATION BY FORCED PUSHDOWN OF FILTER ATTRIBUTES IN CALCULATION MODELS

BACKGROUND

A data management system may include relational databases and one or more engines that are used to query the relational databases. A query plan may be a solution to express data flows and calculations on the data of the relational databases. For instance, the query plan is used by a query engine to obtain data from the relational databases in an efficient manner. During query runtime, the query engine may employ several optimizations for better performance. In some examples, the optimizations applied to the query models may include the removal of attributes from the query model that are not required by the query or other parts of the query model.

However, the removal of attributes by the query engine's optimizer may change the semantics of the query and may affect the query's performance. For instance, the query model may include a number of operator nodes where each performs an operator. When combining the query model with the query, the filter of the query is provided on the top operator node of the instantiated query model. However, in this situation, one or more filter attributes of the filter may have to be populated throughout the query model, which may adversely affect the semantics and/or performance of the query.

SUMMARY

According to an aspect, a system for moving a filter in a query model to ensure query semantics includes a query engine configured to obtain a query model for a query to be executed on a database. The query engine includes a query optimizer configured to instantiate the query model by merging the query with the query model. The query optimizer includes a filter mover configured to move a filter to a point within the instantiated query model such that semantics for the query within the instantiated query model is ensured.

In some examples, the system may include one or more of the following features (or any combinations thereof). The filter is originally specified to be executed at a first point within the instantiated query model, and the filter mover is configured to move the filter to a second point within the instantiated query model, where the second point is located downstream from the first point within the instantiated query model. The filter includes a filter attribute, and the query optimizer includes a filter attribute marker configured to mark the filter attribute as filter transparent, and an attribute remover configured to remove the filter attribute from at least one operator node of the instantiated query model. The point is downstream from a point originally specified to execute the filter. The instantiated query model includes a plurality of operator nodes including a top-level operator node and a bottom-level operator node, and the filter mover is configured to move the filter from the top-level operator node to an operator node proximate to the bottom-level operator node. The query model is a calculation model providing a calculation flow, and the query engine is a calculation engine different from a standardized query language (SQL) engine. The query model is a directed acyclic graph (DAG). The query optimizer includes a semantics checker configured to determine whether the filter can be moved downstream within the instantiated query model, and the semantics checker is configured to generate an error if the filter cannot be moved downstream within the instantiated query model. The filter mover is configured to move the filter from a first operator node to a second operator node, where if the filter is not moved such that the first operator includes the filter, a filter attribute is populated on a third operator node located between the first operator node and the second operator node such that the filter attribute's inclusion on the third operator node changes a semantics of the query. The query optimizer includes an attribute remover configured to remove the filter attribute on the third operator node.

According to an aspect, a method for moving a filter in a query model to ensure query semantics includes obtaining a query model for a query to be executed on a database. The query specifies a filter on data within the database. The method includes instantiating the query model by merging the query with the query model and decoupling the filter from an originally-specified execution point and moving the filter to a new execution point located downstream from the originally-specified execution point within the query execution flow of the query model, and executing the query with a query execution plan having the instantiated query model.

In some examples, the method may include one or more of the following features (or any combination thereof). The method may include marking at least one filter attribute of the filter within the query model as filter transparent, and removing the at least one filter attribute from an operator node located upstream from the new execution point within the query execution flow. The method may include evaluating whether the filter can be moved downstream from the originally-specified execution point, and generating an error message if the filter cannot be moved downstream. The originally-specified execution point is a top-level operator node, and the new execution point is an operator node located towards a bottom-level operator node.

According to an aspect, a computer program product tangibly embodied on a non-transitory computer-readable storage medium and including executable code that, when executed, is configured to cause at least one processor to obtain a query model for a query to be executed on a database, instantiate the query model such that the query is merged with the query model, decouple a filter of the query from an originally-specified execution point, move the filter to a new execution point located downstream from the originally-specified execution point within the query execution flow of the query model, and remove at least one marked filter attribute from the query model, where the at least one marked filter attribute has been marked as filter transparent.

In some examples, the computer program product may include one or more of the following features (or any combination thereof). The at least one marked filter attribute is marked with a flag. The executable code that, when executed is configured to cause the at least one processor to evaluate whether the filter can be moved downstream from the originally-specified execution point, and generate an error message if the filter cannot be moved downstream. The at least one marked filter attribute is removed from an operator node located between the originally-specified execution point and the new execution point. The removal of the at least one marked filter attribute from the operator node causes a semantics of the query to be consistent with a grouping provided by the operator node from which the at lest one marked filter attribute is removed. The executable code to obtain the query model includes executable code to obtain the query model from a database storing a plurality of query models.

The details of one or more implementations are set forth in the accompanying drawings and the description below. Other features will be apparent from the description and drawings, and from the claims.

DETAILED DESCRIPTION

The embodiments provide systems and methods for inserting a filter into a query model without changing query semantics of operator nodes where the filter is not required. For instance, in some examples, the filter must be pushed down to a certain level in the tree of operator nodes. In conventional approaches, if filter push-down is not possible, the wrong results may be returned. However, according to the embodiments, the query model is annotated such that the filter is pushed down to a certain level in the tree of operator nodes such that the query semantics of the operators where the filter is not required is not changed, thereby ensuring the semantics of the query and obtaining the correct result. On the other hand, if the filter cannot be pushed down in the query model, the query results are not returned but rather an error message is generated.

When a query is received, one or more query models may be obtained from the database, and optimized. Optimization of the query models may include instantiation. Instantiation may include merging the query with the obtained query model and removing unnecessary attributes from query model. When instantiating the query model, the placement of the filter within the query model may be changed such that the filter is moved from its originally-designed execution point (but not required point) within the query model to a different point within the query model such that the semantics of the query remain consistent with the query model and/or the filter's new execution point enhances performance of the query.

In some examples, the filter is pushed down in the query model as far as possible. Also, in some examples, if the filter cannot be pushed down at all, an error message may be returned in order to prevent obtaining the wrong results from the database. For example, if the filter remains at the top-level operator node (or requesting node), an error message may be returned. Also, during instantiation, filter attributes may be marked as filter transparent such that the marked filter attributes are not considered in one or more other operators so that the filter attributes do not affect the grouping granularity. For example, the filter attributes are marked so that they are only used for the enablement of the filter. Then, the marked filter attributes may be removed from these non-filter operators so that the filter attributes to not affect the attributes' grouping in these operators. These and other features of the embodiments are further described with reference to the figures.

Figure 1:
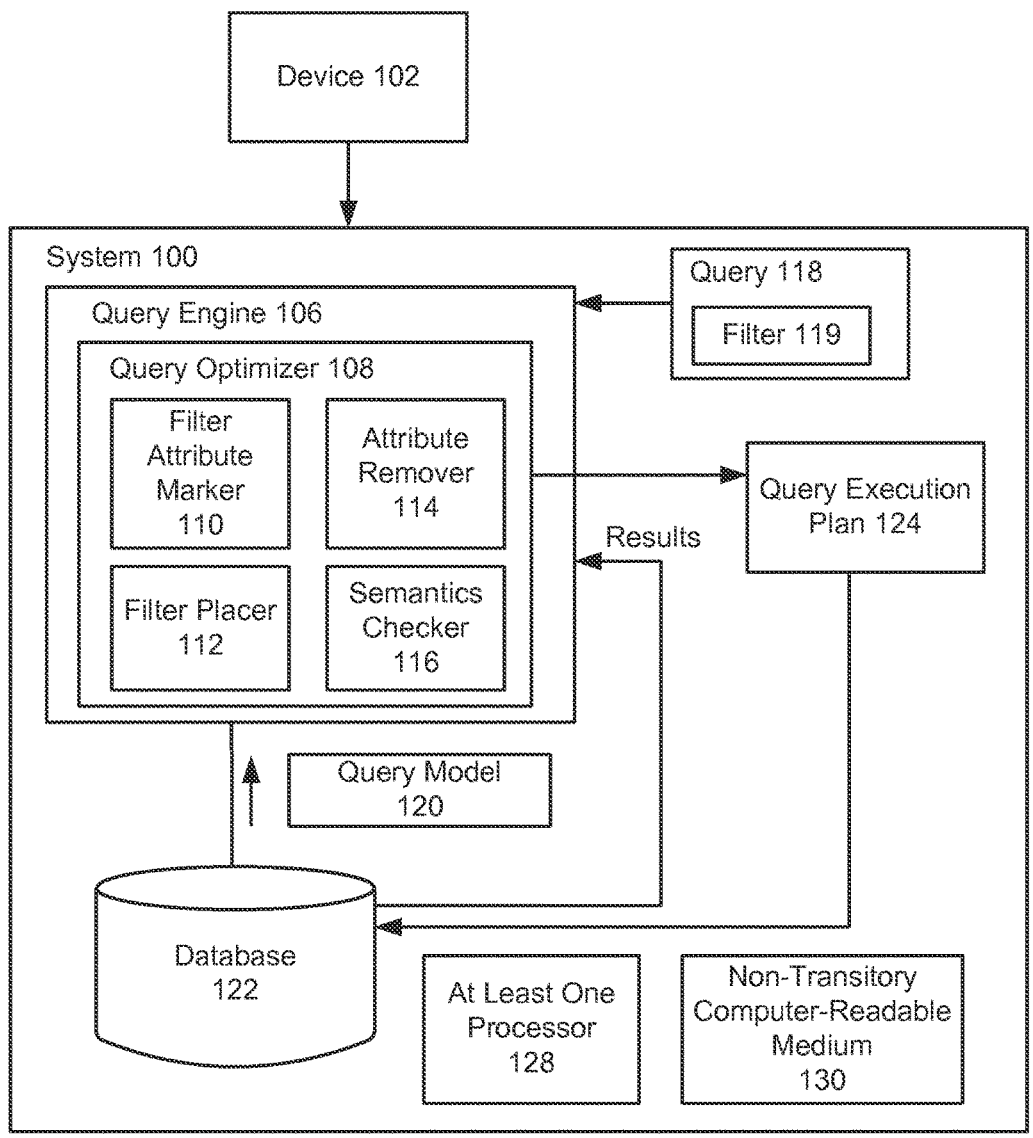
FIG. 1 illustrates a system for inserting a filter in a query model to ensure proper semantics of a query to be executed on a database according to an aspect.

FIG. 1 illustrates a system 100 for inserting a filter 119 in a query model 120 to ensure proper semantics of a query 118 to be executed on a database 122 according to an aspect. The system 100 may be any type of data management system that queries, retrieves, and/or manipulates data from the database 122. In some examples, the system 100 may manage data within the database 122. The data may be any type of data capable of being stored within the database 122 such as business data, sales data, accounting data, engineering data, system or process data, and/or generally any type of data. In some examples, the management of business data by the system 100 may permit a comprehensive business intelligence solution for assisting with business decisions (e.g., predicting a new location to open a store based on existing sales data). The system 100 may be configured to perform complex calculation scenarios and/or analytics on the data stored in the database 122. As such, the data retrieval and computations performed by the system 100 may be relatively complex involving a series of query execution steps, which is compounded by the fact that the database 122 may store a relatively large amount of data across a number of business entities. Also, the user typically wants the query results rather quickly. Therefore, the manner in which the system 100 queries, retrieves, and manipulates data within the system 100 may be relatively important.

In some examples, the system 100 may be a relational database management system (RDBMS). In some examples, the system 100 may be an in-memory database. The in-memory database may be a type of database management system that relies on main memory for computer data storage. In contrast, conventional database systems employ a disk storage mechanism. In some examples, the in-memory database may include a combination of main memory and disk storage. Also, the in-memory database may support real-time analytics and transactional processing including replication and aggregation techniques. Also, within the in-memory database environment, calculation logic is pushed down into the database layer (as opposed to remaining in the application layer) such that the processing time for querying and manipulating the data may be reduced as compared with conventional relational database systems. In some examples, the in-memory database may be HANA Enterprise 1.0 (any other versions) that is developed by SAP. However, the techniques described herein may be applied to any type of relational database system.

The system 100 may operate in conjunction with Structured Query Language (SQL). Generally, SQL refers to a special-purpose programming language designed for managing data held in a relational database management system including an in-memory database. In some examples, SQL may refer to various types of data related languages including, e.g., a data definition language and a data manipulation language, where a scope of SQL may include data insert, query, update and delete, schema creation and modification, and data access control, and SQL may include procedural elements. Further, in some example implementations, SQL may include descriptions related to various language elements, including clauses, expressions, predicates, queries, and statements. For instance, clauses may refer to various constituent components of statements and queries, and in some instances, clauses may be considered optional. Further, expressions may be configured to produce scalar values and/or tables that include columns and/or rows of data. Also, predicates may be configured to specify conditions that may be evaluated to SQL three-valued logic (3VL) (true/false/ unknown) and/or Boolean truth values, which may be used to moderate effects of statements and queries, and which may be used to modify program flow.

The system 100 may include a query engine 106 configured to execute the query 118 on the database 122 according to a query execution plan 124 that includes one or more optimized query models 120 (e.g., optimized by a query optimizer 108). Then, the query engine 106 is configured to return query results of the query 118 to a device 102 communicatively coupled to the system 100. In some examples, the query results may be one or more calculation views that processes and manipulates the data in the database 122. The device 102 may provide a user interface (UI) that receives queries and/or preferences from a user for managing or utilizing the system 100 and displays the query results.

The query 118 may be a request to view, access, and/or manipulate data stored in the database 122. In some examples, the query 118 may be received at the system 100 from the device 102. Generally, a query 118 is a request for information from the database 122, and the query results may be generated by accessing relevant data from the database 122, and manipulating the relevant data to yield requested information. In some examples, the database 122 may include one or more database structures or formats such as column-store data storage, row-store data storage, and/or object-store data storage. The database structures may be considered complex, where desired data for the query 118 may be retrieved from the database 122 by accessing data using different ways, with different data structures, and in different orders, which typically affects processing times. For instance, processing times of the same queries may vary depending on the manner in which the data is retrieved and/or selected from the database 122. It is noted that the techniques described herein may be applied regardless of the storage format of the database 122. For instance, the techniques described herein may be applied to the column-store data storage, row-store data storage, or object-store data storage, or any combinations thereof.

The query 118 may specify a filter 119 to be applied to the data of the database 122. Generally, the filter 119 may be an operation to obtain a subset of data in a range of cells or tables. The filter 119 may be a function to reduce a dataset specified by the query 118 to a certain filter attribute. The filter attribute may be a certain range or characteristic. The execution of the filter 119 may obtain the subset of data or reduce the dataset based on one or more filter attributes that may be applied to the data. For instance, the filter 119 returns only the data that matches or otherwise includes the filter attributes. In some examples, the query 118 may be expressed in an SQL format. For instance, the filter 119 may be identified by the phrase "WHERE" followed by one or more filter attributes.

The query engine 106 is configured to determine the query execution plan 124 based on one or more query models 120 retrieved from the database 122. For example, the query engine 106 may be configured to obtain or otherwise derive the query model 120 in response to the query 118, and then optimize the query model 120 to derive the query execution plan 124 which is used to execute the query 118 on the database 122. In particular, at query runtime, all involved query models 120 and the query 118 itself are combined into a single query execution plan 124. In some examples, the query execution plan 124 is considered an optimized query model 120. In some examples, the query execution plan 124 includes multiple query models 120 that have been optimized. In some examples, the query models 120 may be stacked and optimized to be included within the final runtime query execution plan 124. For example, in order to improve reusability and flexible design, the query models 120 may be stacked to provide even more complex scenarios.

The query engine 106 may include one or more engines. For example, the query engine 106 may include a join engine, online analytical processing (OLAP) engine, and/or a calculation engine. The join engine may be used to perform all types of joins. In some examples, the join engine may process the query 118 to obtain an attribute view. The OLAP engine may be used for calculation and aggregation. In some examples, the OLAP engine may process the query 118 to obtain an analytical view. The calculation engine may be provided on top of the OLAP engine and/or the join engine. The calculation engine may be used for complex calculations that cannot be accomplished by the join engine or the OLAP engine. The calculation engine may process the query 118 to obtain a calculation view.

The query model 120 may be a generic query model that provides the framework for querying data in the database 122 in an efficient manner. In some examples, the query model 120 may be referred to as a query plan or query scenario. The query model 120 may be a collection of generic operators designed to accomplish the functions related to the query 118. The query model 120 may be considered a template that provides an outline of the query 118 to be performed on the database 122. The query model 120 may specify one or more operator nodes that encapsulate operations for executing the query 118. The operator nodes may be arranged in a tree structure, where results flow from a lower portion of the tree to an upper portion of the tree. Each operator node may include zero or more child nodes, where output from the child nodes are fed as input to related parent nodes. For instance, a join node may include two child nodes that may represent two join operands, whereas a sort node may include a single child node with the input for sorting. Leaves of the tree may include operator nodes that produce results by scanning tables, including performing index scans and/or sequential scans. The query model 120 may be generic in the sense that it may be reusable by subsequent queries.

In some examples, the query model 120 may be a calculation model (or calculation plan or calculation scenario) that performs relatively more complex operations on the data in order to provide one or more calculation views. The calculation model may include custom calculation flows that provide enhanced functionality in contrast to standard SQL or relational functions. In some examples, the calculation model may include a directed acyclic graph (DAG) that expresses complex data flows and calculations within the database 122. If the query model 120 is the calculation model, the query engine 106 is the calculation engine which is used to execute the query 118 according to the calculation model.

In response to the query 118, the query engine 106 may parse the query 118, and obtain one or more query models 120 from the database 122. For example, the query engine 106 may be configured to obtain the query model 120 from the database 122, which stores a number of different query models, by selecting the query model 120 (or more than one query model 120) that generally corresponds to the type of operations specified by the query 118. In other examples, the query engine 106 may create or derive the query model 120 on the fly in response to the query 118. For example, the query engine 106 may derive the query model 120 without obtaining an already-created query model 120 from the database 122.

Then, the query model 120 may be optimized by the query engine 106. For example, the query engine 106 may include a query optimizer 108 configured to optimize the query model 120. In some examples, the query optimizer 108 is not included within the query engine 106, but located separately from the query engine 106. The query optimizer 108 may include an SQL optimizer. In other examples, the query optimizer 108 may include a non-SQL optimizer. As part of the optimization procedure, the query optimizer 108 may tailor the query model 120 (which may be relatively generic) to the requested query 118 and process the query model 120 to enable the query model 120 to be executed in an efficient manner. The query optimizer 108 may be configured to output the optimized query model 120 as the query execution plan 124 (or a portion thereof if combined with other query models 120). Then, the query engine 106 may be configured to execute the query execution plan 124 on the database 122, and provide the query results to the device 102.

The query optimizer 108 may perform one or more optimization operations including instantiation. During an instantiation operation, the query optimizer 108 may be configured to merge the query 118 with the obtained query model 120 and remove unnecessary attributes from query model 120. For example, if an attribute is not required by the query 118 and is not required by other parts of the query model 120, the query optimizer 108 may be configured to remove that attribute from the query model 120.

However, in contrast to conventional approaches, during instantiation (or optimization of the query model 120), the query optimizer 108 is configured to de-couple the point at which the filter 119 is specified to be executed and move the filter 119 to another point within the query model 120. For example, when instantiating the query model 120, the placement of the filter 119 within the query model 120 may be changed such that the filter 119 is moved from its originally-designed point (but not required point) within the instantiated query model 120 to a different point within the instantiated query model 120 such that the semantics of the query 118 remain consistent with the query model 120 and/or the filter's new execution point enhances performance of the query 118.

The filter 119 may specify retrieval or manipulation of data having one or more attributes—referred to as filter attributes. A filter attribute may be any type of parameter or value that represents a characteristic of the data. In the case of SQL, the filter 119 may be specified within the query 118 by the term "WHERE" which is followed by one or more filter attributes. In some examples, the query model 120 or the query optimizer 108 may specify the location of the filter 119 within the query model 120 or the timing of when the filter 119 is executed within the context of the overall query model 120. The location or point may be a type of operator within the query execution flow of the query model 120.

Stated another way, the logic of the query optimizer 108 (and/or the instructions of the query model 120) may specify the point at which the filter 119 is executed within the context of the overall query model 120. In some examples, the filter 119 may be specified to be executed on the top-level operator node (also referred to as the requesting node) or at a certain operator node. Merging the filter 119 on the top of the query model 120 may allow the query model 120 to be relatively generic, and thus reusable. In some examples, during instantiation, the query 118 and the query model 120 are merged such that the query 118 is always placed on the top-level operator node or the requesting node.

In a simple non-limiting example, the query 118 may specify that a certain range of data be retrieved using the filter 119, and the query model 120 may specify a first aggregation node, a second aggregation node, a projection node, and a table node. Further, the query model 120 may specify to apply the filter 119 on the first aggregation node (e.g., the top-level node). In some cases, the filter's attribute must be populated throughout the query model 120 and this may affect the performance and/or semantics of the query 118—which may or may not lead to incorrect query results. In some examples, the filter's attribute is populated on the second aggregation node (e.g., the node following the top-level node) within the query model 120 which is not entirely consistent with the semantics of the query 118 because the attribute grouping of the second aggregation node would have to be changed, and this may produce incorrect query results.

However, according to the embodiments, when optimizing the query model 120, instead of placing the filter 119 as originally-specified by the system 100 (e.g., placing the filter on the top-level operator node), the query optimizer 108 may decouple the point at which the filter 119 is to be executed, and move the filter 119 to another point within the query model 120—which may be downstream from the top-level operator node—in order to ensure proper semantics for the query 118. For instance, if the filter 119 is originally set to be executed at point A, the query optimizer 108 may decouple the filter 119 from point A and move the filter 119 to point B within the query model 120 in a manner that ensures semantic correctness and improves performance of the query 118. Stated another way, if the placement of the filter 119 is not required at a certain operator node within the query model 120, the filter 119 may be moved downstream in the query execution flow of the query model 120. The term downstream may refer to a location away from the top-level operator node, or, alternatively, towards the bottom-level operator node which is the source of data. The term upstream may refer to a location towards the top-level operator node of the tree structure, and the term downstream may refer to a location away from the top-level operator node.

In some examples, query optimizer 108 is configured to push the filter 119 downstream in the query model 120 as far as possible. Also, the query optimizer 108 is configured to move the filter 119 downstream in a manner that the query semantics for the operator nodes that do not require the filter 119 are ensured. In one particular example, if the filter 119 is specified to be moved downstream in order to change the query semantics, but for whatever reasons, the filter 119 cannot be moved downstream, the wrong results may be obtained. However, as further described below, according to the embodiments, the query model 120 is annotated such that the filter 119 must be pushed down in the query model 120. However, if the filter 119 cannot be pushed down in the query model 120, an error message may be generated instead of providing incorrect query results. Therefore, in some examples, the query optimizer 108 is configured to evaluate whether the filter 119 can be moved downstream in the query model 120, and if it is determined that the filter 119 cannot be moved downstream, the query optimizer 108 is configured to generate and return the error message.

In some examples, the query optimizer 108 may be configured to mark filter attributes as filter transparent if they are not requested by the query 118. The filter attributes marked as filter transparent may indicate that these attributes are considered only for the enablement of the filter 119. In one example, the filter attribute is B=3, but B is not requested by the query 118. In this case, the filter attribute B may be marked as filter transparent because B is not required but is used for filtering, therefore filter pushdown is relevant. However, if B is requested by the query 118, the filter attribute B may not be marked as filter transparent and may have to be mapped to the top-level or root node anyways, therefore filter pushdown is irrelevant. During instantiation, non-requested filter attributes may be marked as filter transparent such that the marked filter attributes are considered for only the enablement of the filter 119, but not required within a non-filter related operator (e.g., an aggregation involving an attribute grouping). Then, the marked filter attributes may be removed from these operators. The query optimizer 108 may be configured to remove the marked filter attributes from any of the operator nodes above the filter's new execution point.

The query optimizer 108 may include a filter attribute marker 110, a filter placer 112, an attribute remover 114, and a semantics checker 116. The query optimizer 108 may include other components that are well known to one of ordinary skill in the art. The filter attribute marker 110 may be configured to mark the filter attributes as filter transparent. For example, the filter attribute marker 110 may be configured to annotate the filter attributes of the filter 119 within the query model 120 as being relevant to only the enablement of the filter 119. In some examples, the filter attribute marker 110 may be configured to annotate the filter attributes as filter transparent based on information received from a user. For example, the user may create and/or modify the query models 120 stored in the database 122 with a model editor, and during the creating or editing process, the user may annotate the filter attributes for a particular query model 120 as being filter transparent. The filter attributes marked as filter transparent are used only for the enablement of the filter 119 within the context of the query model 120, and are not considered in other operator nodes which would affect their attributes grouping in a manner that is inconsistent with the query 118. In some examples, the marked filter attributes are not considered in the "Group By" phrase in any operator nodes. In some examples, the filter attribute marker 110 may be configured to mark the filter attributes using a special flag indicating that these filter attributes are only for the enablement of the filter 119, but should not change the semantics of the query 118 (e.g., group by granularity) or performance of the query 118.

The filter placer 112 may be configured to move the filter 119 to another point within the query model 120. For example, if the query model 120 specifies that the filter 119 is evaluated at operator node A within the query model 120, the filter placer 112 may decouple the filter 119 from operator node A and move the filter 119 to operative node B in a manner that ensures semantic correctness and improves performance of the query 118. The filter placer 112 may move the filter 119 downstream in the query model 120. The filter placer 112 may use a filter pushdown mechanism to move the filter 118 as far downstream as possible on the operator node tree while ensuring semantic correctness. The filter placer 112 may move the filter 119 away from the top-level operator node. The filter placer 112 may move the filter 119 towards a bottom-level operator node such as a distance-calculation node, projection node, and/or table node.

During filter push-down, the attribute remover 114 may be configured to remove the previously marked filter attributes from the query model 120 as soon as they are not required anymore. For example, as the filter 119 is pushed down the operator node tree of the query model 120, at each operator node having the marked filter attribute, the attribute remover 114 in conjunction with the semantics checker 116 may determine if the marked filter attribute is needed or required for semantic correctness. If the marked filter attribute is not required, the attribute remover 114 may be configured to remove the filter attribute from that operator node.

After the query optimizer 108 performs all (or most of) the optimization operations, the semantics checker 116 may be configured to determine whether there are any marked filter attributes present in the query model 120. If the semantics checker 116 determines that at least one marked filter attribute has not been removed, the semantics checker 116 may be configured to generate an error or error message. This is done in order to ensure any user-defined semantics of the query model 120. For example, the user-defined semantics may indicate that this filter attribute must be executed at an operator node. As such, despite being marked, the attribute remover 114 would not remove this attribute from that operator node of the query model 120. In such a case, the query engine 106 would not execute the query 118, but rather the semantics checker 116 would generate an error in order to avoid incorrect results.

In some examples, the query engine 106, the query optimizer 108, and the database 122 are implemented within the in-memory database. For example, the query engine 106, the query optimizer 108, and the database 122 are implemented at the database level. If an application solution is implemented with a three tier solution (e.g., interface, application server, and database), the query engine 106, the query optimizer 108, and the database 122 are implemented in the database level as opposed to the application server or the interface (web interface). In these examples, one or more database clients (e.g., application servers, web applications, etc.) may interact with the in-memory database by submitting queries and receiving query results. In other examples, the query engine 106, the query optimizer 108, and the database 122 are implemented as part of a relational database system such that these components may be distributed across multiple devices or layers or included within a single device or layer.

The system 100 may include at least one processor 128, and a non-transitory computer-readable medium 130 storing executable code that, when executed by the at least one processor 128, is configured to implement the components and functionalities of the system 100 including the query engine 106 and the query optimizer 108. The non-transitory computer-readable medium 130 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. Also, the non-transitory computer-readable medium 130 may include any devices configured as main memory and/or disk storage. The at least one processor 128 may include any type of general purpose computing circuitry or special purpose logic circuitry, e.g., an FPGA (field programmable gate array) or an ASIC (application specific integrated circuit). Also, the at least one processor 128 may be one or more processors coupled to one or more semi-conductor substrates.

Figure 2:
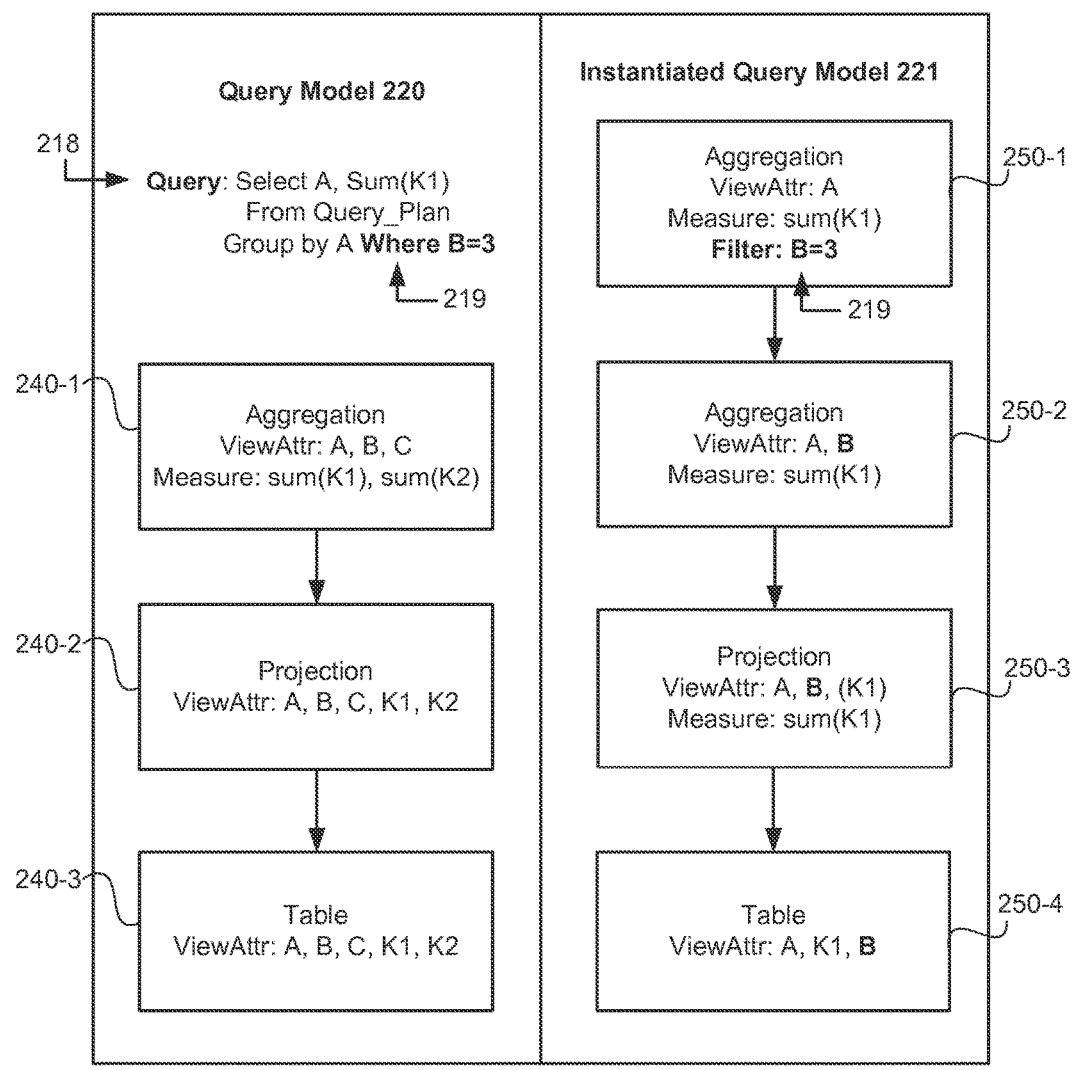
FIG. 2 illustrates a query model and an instantiated query model that specifies a filter on a top-level operator node, and, as a result, forces the filter attribute to be populated on another operator node, thereby changing the semantics of the grouping query.

FIG. 2 illustrates a query model 220 and an instantiated query model 221 that specifies a filter 219 on a top-level operator node 250-1, and, as a result, forces the filter attribute B to be populated on the second aggregation node 250-2, thereby changing the semantics of the grouping ("Group by") of the query 218. This affects the query performance as the attribute B has to be piped throughout the entire instantiated query model 221. Also, the semantics of the query 118 is changed by changing the grouping granularity on the second aggregation node 250-2.

As shown in FIG. 2, the query model 220 specifies the query 218 and generic operator nodes 240 (also referred to as operators). In a non-limiting example, the generic operator nodes 240 include an aggregation node 240-1, a projection node 240-2, and a table node 240-3. However, these types of operators are used for explanatory purposes only, where the query model 220 may include any type and arrangement of nodes. As indicated above, the query optimizer 108 may perform one or more optimization procedures on the query model 220 obtained from the database 122 to obtain an instantiated query model as depicted as the instantiated query model 221.

Part of the instantiation (or optimization) procedure may involve removing unnecessary attributes from the query model 220. As such, the instantiated query model 221 may be a more tailored-version of the query model 220 that corresponds to the query 218 (e.g., attributes K2, C are removed). As shown in FIG. 2, the instantiated query model 221 may include an arrangement of operator nodes 250. In this example, the instantiated query model 221 includes a first aggregation node 250-1, a second aggregation node 250-2, a projection node 250-3, and a table node 250-4. In order to provide a reusable query model 220, in this example, the filter 219 is made available on the top-level operator node, and thereby placed on the first aggregation node 250-1 in the instantiated query model 221. For example, the query 218 and the query model 220 are merged such that the query 218 is placed on the top-level operator node (the first aggregation node 250-1), which, as a result, causes the filter 219 to be placed on the top-level operator node. However, the placement of the filter 219 on the first aggregation node 250-1 forces the filter attribute B to be on the second aggregation node 250-1. As a result, the semantics of the "Group by" of the query 218 is changed, which may lead to incorrect results.

Figure 3:
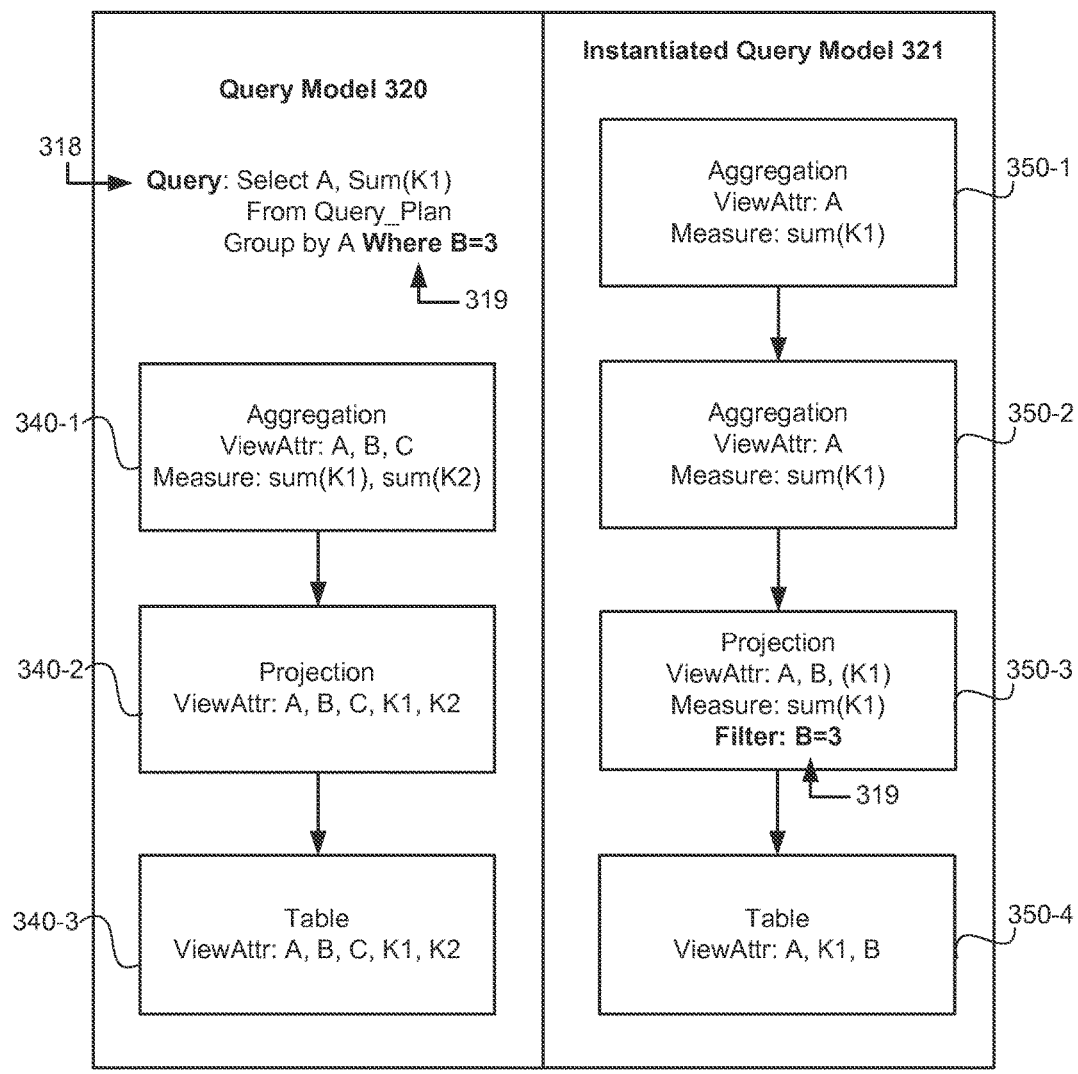
FIG. 3 illustrates a query model and an instantiated query model that moves the filter further downstream in order to ensure semantic correctness of the query and/or improve performance of the query according to an aspect.

In contrast to FIG. 2, FIG. 3 illustrates a query model 320 and an instantiated query model 321 that moves the filter 319 further downstream in order to ensure semantic correctness of the query 318 and/or improve performance of the query 318 according to an aspect. The query model 320 and the instantiated query model 321 may be examples of the query model 120 explained with reference to FIG. 1. The query optimizer 108 is configured to de-couple the point at which the filter 319 is specified to be evaluated and move the filter 319 to another point within the instantiated query model 321. For example, when instantiating the query model 320, the placement of the filter 319 within the query model 120 may be changed such that the filter 319 is moved from its originally-designed point (but not required point) within the query model 320 to a different point within the instantiated query model 321 such that the semantics of the query 318 remain consistent with the instantiated query model 321 and/or the filter's new evaluation point enhances performance of the query 318.

For example, during instantiation, the query optimizer 108 is configured to merge the query 318 with the query model 320. In some examples, the query 318 may be an SQL query having the filter 319. The filter 319 may be specified by the phrase "Where" followed by at least one filter attribute (B=3). In some examples, the query engine 106 is configured to obtain the query model 320 based on the query 318. For example, the query engine 106 may be configured to obtain or otherwise derive the query model 320 in response to the query 318, and then optimize the query model 320 by instantiating the query model 321 which is a more tailored-version of the query model 320. After the optimization procedures, the instantiated query model 320 is included as part of the query execution plan 124 to execute the query 318 on the database 122.

The query model 320 may specify one or more operator nodes that encapsulate operations for executing the query 318. As shown in FIG. 3, the query model 320 may include the query 318, a first aggregation node 340-1, a projection node 340-2, and a table node 340-3. However, it is noted that the specific example of FIG. 3 is used for explanatory purposes only, where the embodiments may encompass any types of operator nodes 340. Also, in some examples, the query model 320 may be a calculation model (or calculation plan or calculation scenario) that performs relatively more complex operations on the data in order to provide one or more calculation views of the requested data. The query model 321 may include a directed acyclic graph (DAG) that expresses complex data flows and calculations within the database 122.

The query optimizer 108 may be configured to instantiate the query model 321 by merging the query 318 with the query model 320 such that the marked filter attributes of the filter 319 are removed from one or more operator nodes 350 and the filter 319 is pushed further down in the instantiated query model 321 in order to ensure semantic correctness of the query 318 within the instantiated query model 321.

The filter attribute marker 110 may mark the filter attribute B as filter transparent, and the filter placer 112 may move the filter 319 downstream to the projection node 350-3 in order to ensure semantic correctness of the query 318. Because the filter attribute B is not needed or required on the second aggregation node 350-2 (as well as for the fact that its inclusion would change the semantics of the query), the attribute remover 114 is configured to move the attribute B from the second aggregation node 350-2. Also, it is noted that the query optimizer 108 may be configured to remove other non-essential attributes (e.g., C, K2) because they are not required by the query 318. However, after all optimizations, if the second aggregation node 350-2 still contains the filter attribute B, the semantics checker 116 generates an error message.

Figure 4:
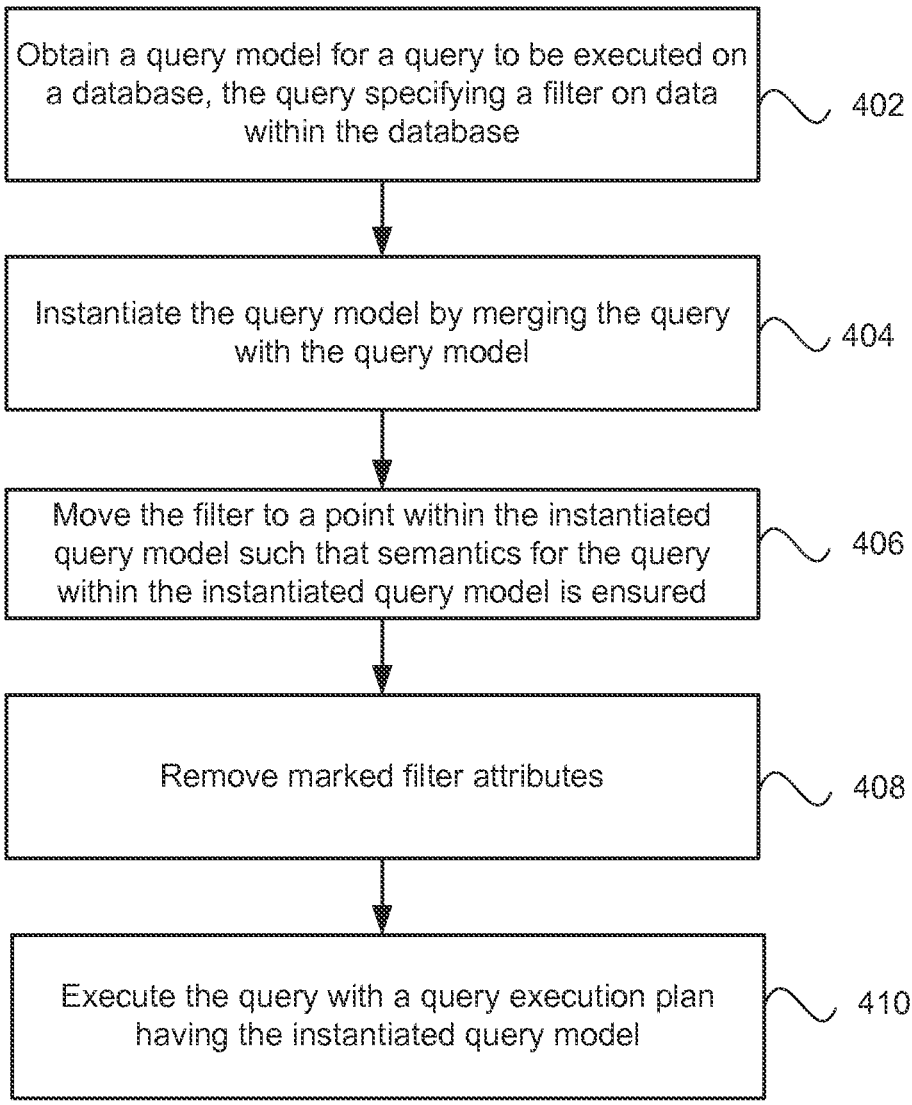
FIG. 4 is a flowchart illustrating example operations of the system of FIG. 1 according to an aspect.

FIG. 4 is a flowchart illustrating example operations of the system 100 according to an aspect. Although FIG. 4 is illustrated as a sequential, ordered listing of operations, it will be appreciated that some or all of the operations may occur in a different order, or in parallel, or iteratively, or may overlap in time.

A query model for a query to be executed on a database may be obtained, where the query specifies a filter on data within the database (402). For example, as discussed with reference to FIGS. 1 and 3, the query engine 106 may be configured to obtain the query model 120 for the query 118 to be executed on the database 122. In further detail, in response to the query 118, the query engine 106 may parse the query 118, and obtain one or more query models 120 from the database 122. In some examples, the query 118 may be expressed in an SQL format. The query 118 may specify the filter 119. The query 118 may be a request to view, access, and/or manipulate data stored in the database. The filter 119 may be identified by the phrase "WHERE" followed by one or more filter attributes. In some examples, the query model 120 may be a calculation model or calculation scenario providing a calculation flow, and the query engine 106 is a calculation engine different from a standardized SQL engine. In some examples, the query model 120 is a directed acyclic graph (DAG).

The query model may be instantiated by merging the query with the query model (404). For example, as discussed with reference to FIGS. 1 and 3, the query optimizer 108 may be configured to instantiate the query model 120 by merging the query 118 with the query model 120. For example, the query optimizer 108 may perform one or more optimization operations including an instantiation procedure. During the instantiation procedure, the query optimizer 108 may be configured to merge the query 118 with the obtained query model 120 and remove unnecessary attributes from query model 120. For example, if an attribute is not required by the query 118 and is not required by other parts of the query model 120, the query optimizer 108 may be configured to remove that attribute from the query model 120.

The filter may be moved to a point within the instantiated query model such that semantics for the query within the instantiated query model is ensured (406). For example, the query optimizer 108 may be configured to move the filter 119 to a point within the instantiated query model 120 (or 321) such that semantics for the query 118 is ensured. For instance, when optimizing the query model 120, instead of placing the filter as originally-specified by the system 100, the query optimizer 108 may decouple the point at which the filter 119 is to be executed, and move the filter 119 to another point within the query model 120, which may be downstream from the top-level operator node, in order to ensure proper semantics for the query.

Marked filter attributes may be removed (408). For example, the query optimizer 108 may be configured to remove the marked filter attributes from the query model 120. During instantiation, the filter attributes may be marked as filter transparent such that the marked filter attributes are not considered in any operation that groups the filter attribute with other filter attributes. For instance, the filter attributes may be marked such that the filter attributes are only used for the enablement of the filter 119 within the instantiated query model 120. The query optimizer 108 may be configured to remove the marked filter attributes from the query model 120. For instance, the query optimizer 108 may be configured to remove the marked filter attributes from any of the operator nodes where the filter attributes are required or needed.

The query may be executed with a query execution plan having the instantiated query model (410). For example, the query engine 106 may be configured to execute the query execution plan 124 having the instantiated query model 120. The query engine 106 is configured to determine the query execution plan 124 based on one or more query models 120 retrieved from the database 122. In particular, at query runtime, all involved query models 120 and the query 118 itself are combined into a single query execution plan 124.

Figure 5:
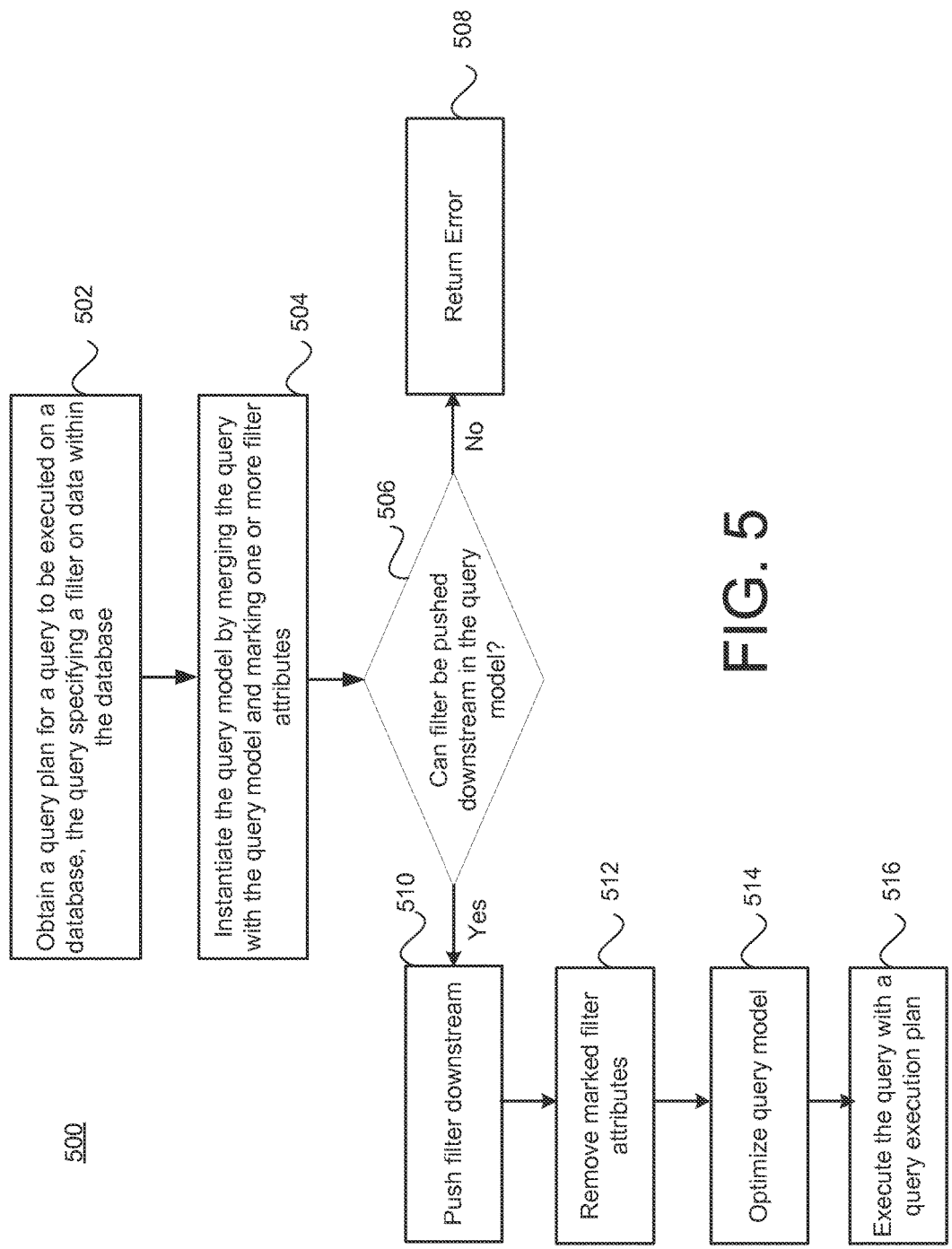
FIG. 5 is a flowchart illustrating example operations of the system of FIG. 1 according to another aspect.

FIG. 5 is a flowchart illustrating example operations of the system 100 according to another aspect. Although FIG. 5 is illustrated as a sequential, ordered listing of operations, it will be appreciated that some or all of the operations may occur in a different order, or in parallel, or iteratively, or may overlap in time.

A query model for a query to be executed on a database may be obtained, where the query specifies a filter on data within the database (502). As discussed with reference to FIGS. 1 and 3-4, the query engine 106 may be configured to obtain the query model 120 for the query 118 to be executed on the database 122.

The query model may be instantiated by merging the query with the query model and marking one or more filter attributes (504). For example, as discussed with reference to FIGS. 1 and 3-4, the query optimizer 108 may be configured to instantiate the query model 120 by merging the query 118 with the query model 120. Also, the filter attribute marker 110 may be configured to mark the filter attributes as filter transparent. For example, the filter attribute marker 110 may be configured to annotate the filter attributes of the filter 119 within the query model 120 as being relevant to only the enablement of the filter 119. In some examples, the filter attribute marker 110 may be configured to annotate the filter attributes as filter transparent based on information received from a user. For example, the user may create and/or modify the query models 120 stored in the database 122 with a model editor, and during the creating or editing process, the user may annotate the filter attributes for a particular query model 120 as being filter transparent. The filter attributes marked as filter transparent are used only for evaluation of the filter 119, and are not considered in other operator nodes.

It is determined whether the filter can be pushed downstream in the query model (506). For example, the query optimizer 108 is configured to evaluate whether the filter 119 can be moved downstream in the query model 120. For example, at each operator node, the query optimizer 108 may be configured to evaluate whether the filter 119 can be pushed to the next below operator. For instance, initially, the query optimizer 108 may be configured to evaluate the operator node below the top-level operator node, and if the filter attribute is not required on that node, the query optimizer 108 proceeds to the next operator node, and so forth. In order to determine whether that operator node does not require the filter attribute, the query optimizer 108 may determine if any user-specific semantics dictate that the filter attribute be present on that operator node. Also, the query optimizer 108 may analyze the structure of the query 118 and if that structure does not indicate that the filter attribute is needed on that operator node, then the query optimizer may determine that the filter attribute is not needed.

If the filter cannot be pushed downstream (No), an error may be returned (508). For example, if it is determined that the filter 119 cannot be moved downstream, the query optimizer 108 may be configured to generate and return the error message. If yes, the filter is pushed downstream (510). In some examples, query optimizer 108 is configured to push the filter 119 downstream in the query model 120 as far as possible (e.g., continually pushing down until its placement would adversely affect the semantics of the query).

The marked filter attributes may be removed (512). For example, during filter push-down, the attribute remover 114 may be configured to remove the previously marked filter attributes from the query model 120 as soon as they are not required anymore. For example, as the filter 119 is pushed down the operator node tree of the query model 120, at each operator node having the marked filter attribute, the attribute remover 114 in conjunction with the semantics checker 116 may determine if the marked filter attribute is needed or required for semantic correctness. If the marked filter attribute is not required, the attribute remover 114 may be configured to remove the filter attribute from that operator node.

The query model may be optimized (514). For example, the query optimizer 108 may be configured to perform other optimizations on the query model 120. The query may be executed with a query execution plan (516). For example, the query engine 106 may be configured to execute the query execution plan 124 having the instantiated query model 120.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable semi-conductor processors (e.g., a processor coupled to a substrate) executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for moving a filter in a query model to ensure query semantics, the system comprising:
    at least one processor;
    a non-transitory computer-readable medium configured to store executable instructions that when executed by the at least one processor are configured to implement:
    a query engine configured to obtain a query model for a query to be executed on a database, the query including a standardized query language (SQL) where clause having a filter attribute of a filter, the query engine configured to merge the query with the query model, wherein the query specifies a point to insert the filter in the query model, wherein the point to insert the filter in the query model comprises a top-level operator node within the query model,
    the query engine including a query optimizer configured to:
        move the filter to a first operator node located downstream from the top-level operator node within the query model such that movement of the filter downstream causes a first instance of the filter attribute to be populated on a second operator node located upstream from the first operator node, and a second instance of the filter attribute to be populated on a third operator node located downstream from the first operator node, the second operator node including an aggregation operation;
        remove one or more attributes from the query model not required by the query or the query mode;
        mark the first instance of the filter attribute as filter transparent within the query model, the marked first instance of the filter attribute indicating that inclusion of the filter attribute on the second operator node changes a semantics of the aggregation operation, the second instance of the filter attribute on the third operator node not being marked; and
        remove the marked first instance of the filter attribute from the second operator node such that the semantics of the aggregation operation of the second operator node is not changed, wherein the second instance of the filter attribute on the third operator node is not removed.

2. The system of claim 1, wherein the query optimizer is configured to generate an error in response to a determination that at least one marked instance of the filter attribute is still included within the query model.

3. The system of claim 1, wherein the first instance of the filter attribute is marked as filter transparent using a special flag.

4. The system of claim 1, wherein the first operator node and the second operator node is disposed between the top-level operator node and a bottom-level operator node.

5. The system of claim 1, wherein the query model is a calculation model and the query engine is a calculation engine different from an SQL engine.

6. The system of claim 1, wherein the query model is a directed acyclic graph (DAG).

7. The system of claim 1, wherein the query optimizer is configured to determine whether the filter can be moved downstream within the query model, and configured to generate an error in response to the determination that if the filter cannot be moved downstream within the query model.

8. A method for moving a filter in a query model to ensure query semantics, the method being performed by at least one processor, the method comprising:
receiving a query to be executed on a relational database, the query including a standardized query language (SQL) where clause having a filter attribute of a filter, the filter being an operation to obtain a subset of data from the relational database, wherein the query specifies a point to insert the filter in the query model, wherein the point to insert the filter in the query model comprises a top-level operator node within the query model;
obtaining a query model for the query to be executed on the relational database;
merging the query with the query model;
optimizing the query model, including:
removing one or more attributes from the query model not required by the query or the query model;
moving the filter to a first operator node located downstream from a top-level operator node within the query model such that movement of the filter downstream causes a first instance of the filter attribute to be populated on a second operator node located upstream from the first operator node, and a second instance of the filter attribute to be populated on a third operator node located downstream from the first operator node, the second operator node including an aggregation operation;
marking the first instance of the filter attribute as filter transparent within the query model, the marked first instance of the filter attribute indicating that inclusion of the filter attribute on the second operator node changes a semantics of the aggregation operation, the second instance of the filter attribute on the third operator node not being marked;
removing the marked first instance of the filter attribute from the second operator node such that the semantics of the aggregation operation of the second operator node is not changed, wherein the second instance of the filter attribute on the third operator node is not removed; and
executing the query on the relational database using the optimized query model.

9. The method of claim 8, further comprising:
evaluating whether the filter can be moved downstream from the top-level operator node; and
generating an error message in response to a determination that the filter cannot be moved downstream from the top-level operator node.

10. The method of claim 8, further comprising:
generating an error in response to a determination that at least one marked instance of the filter attribute is still included within the query model.

11. A computer program product tangibly embodied on a non-transitory computer-readable storage medium and including executable code that, when executed, is configured to cause at least one processor to:
receive a query to be executed on a relational database, the query including a standardized query language (SQL) where clause having a filter attribute of a filter, the filter being an operation to obtain a subset of data from the relational database, wherein the query specifies a point to insert the filter in a query model, wherein the point to insert the filter in the query model comprises a top-level operator node within the query model;
obtain the query model for the query to be executed on the relational database;
merge the query with the query model;
optimize the query model, including:
remove one or more attributes from the query model not required by the query or the query model;
move the filter to a first operator node located downstream from a top-level operator node within the query model such that movement of the filter downstream causes a first instance of the filter attribute to be populated on a second operator node located upstream from the first operator node, and a second instance of the filter attribute to be populated on a third operator node located downstream from the first operator node, the second operator node including an aggregation operation;
mark the first instance of the filter attribute as filter transparent within the query model, the marked first instance of the filter attribute indicating that inclusion of the filter attribute on the second operator node changes a semantics of the aggregation operation, the second instance of the filter attribute on the third operator node not being marked;
remove the marked first instance of the filter attribute from the second operator node such that the semantics of the aggregation operation of the second operator node is not changed, wherein the second instance of the filter attribute on the third operator node is not removed; and
execute the query on the relational database using the optimized query model.

12. The computer program product of claim 11, wherein the first instance of the filter attribute is marked with a flag.

13. The computer program product of claim 11, wherein the executable code that, when executed is configured to cause the at least one processor to:
evaluate whether the filter can be moved downstream from the top-level operator node within the query model; and
generate an error message in response to a determination that the filter cannot be moved downstream from the top-level operator node.

14. The computer program product of claim 11, wherein the executable code that, when executed, is configured to cause the at least one processor to:
generating an error in response to a determination that at least one marked instance of the filter attribute is still included within the query model.

15. The computer program product of claim 11, wherein the first operator node includes a projection operation.

* * * * *